(12) United States Patent
Yeom

(10) Patent No.: US 12,089,769 B2
(45) Date of Patent: Sep. 17, 2024

(54) COOKING DEVICE

(71) Applicant: CUCHEN CO., LTD, Seoul (KR)

(72) Inventor: Kyu Hyun Yeom, Chungcheongnam-do (KR)

(73) Assignee: CUCHEN CO., LTD, Seoul (KR)

( * ) Notice: Subject to any disclaimer, the term of this patent is extended or adjusted under 35 U.S.C. 154(b) by 0 days.

(21) Appl. No.: 18/288,188

(22) PCT Filed: Jun. 14, 2022

(86) PCT No.: PCT/KR2022/008396
§ 371 (c)(1),
(2) Date: Oct. 25, 2023

(87) PCT Pub. No.: WO2022/265349
PCT Pub. Date: Dec. 22, 2022

(65) Prior Publication Data
US 2024/0057804 A1  Feb. 22, 2024

(30) Foreign Application Priority Data

Jun. 14, 2021 (KR) .......................... 10-2021-0077038

(51) Int. Cl.
*A47J 27/08* (2006.01)
*A47J 27/092* (2006.01)

(52) U.S. Cl.
CPC ......... *A47J 27/092* (2013.01); *A47J 27/0802* (2013.01); *A47J 27/0813* (2013.01); *A47J 27/0815* (2013.01)

(58) Field of Classification Search
CPC ................ A47J 27/0802; A47J 27/0804; A47J 27/0806; A47J 27/0811; A47J 27/0813; A47J 27/09; A47J 27/092
See application file for complete search history.

(56) References Cited

U.S. PATENT DOCUMENTS 5,678,721 A   10/1997  Cartigny et al.
6,257,124 B1 *  7/2001  Chen ................... A47J 27/0813
                                                        220/325

(Continued)

FOREIGN PATENT DOCUMENTS

CN    1131905 A    9/1996
CN    1903105 A    1/2007

(Continued)

OTHER PUBLICATIONS

KIPO, Office Action issued in Korean application No. 10-2021-0077038, May 24, 2022, 6 pages.

(Continued)

*Primary Examiner* — Reginald Alexander
(74) *Attorney, Agent, or Firm* — Nicholas Park

(57) ABSTRACT

A cooking device according to an exemplary embodiment of the present disclosure includes: a main body in which an inner pot is accommodated; a top plate provided in a lid cover coupled to the main body; a locking slide coupled on the top plate so as to be linearly movable in a first direction; and a locking structure including an engagement protrusion which is configured to be engaged with a flange portion of the inner pot. The locking structure is configured to be linearly moved, depending on a position of the locking slide performing a linear movement in the first direction, between a locking position where the engagement protrusion is positioned so as to overlap with the flange portion of the inner pot in a vertical direction and an unlocking position spaced apart from the locking position toward an outside of the top plate.

5 Claims, 14 Drawing Sheets

(56) References Cited

U.S. PATENT DOCUMENTS

| | | | | |
|---|---|---|---|---|
| 2005/0284305 A1* | 12/2005 | Angue | ................ | A47J 27/0808 99/337 |
| 2019/0069706 A1* | 3/2019 | Kim | .................... | A47J 27/0813 |

FOREIGN PATENT DOCUMENTS

| | | | | | |
|---|---|---|---|---|---|
| CN | 1037351 | A | | 4/2014 | |
| CN | 106213983 | A | | 12/2016 | |
| CN | 107536446 | A | | 1/2018 | |
| CN | 109222617 | A | | 1/2019 | |
| CN | 212186204 | U | | 12/2020 | |
| EP | 2937026 | A1 | * | 10/2015 | .......... A47J 27/0813 |
| JP | 1978110859 | U | | 9/1978 | |
| JP | 2001-120426 | A | | 5/2001 | |
| JP | 2015208683 | A | | 11/2015 | |
| KR | 10-2004-0040187 | A | | 5/2004 | |
| KR | 20040040188 | A | | 5/2004 | |
| KR | 10-0797150 | B1 | | 1/2008 | |
| KR | 1020090108449 | | * | 10/2009 | .......... A47J 27/0813 |
| KR | 10-2070321 | B1 | | 1/2020 | |
| KR | 10-2021-0050328 | A | | 5/2021 | |

OTHER PUBLICATIONS

KIPO, Decision to Grant a Patent issued in Korean application No. 10-2021-0077038, May 24, 2022, 3 pages.
WIPO, International Search Report for International Application No. PCT/KR2022/008396, Dec. 3, 2021, 5 pages.

* cited by examiner

LOCKING STATE

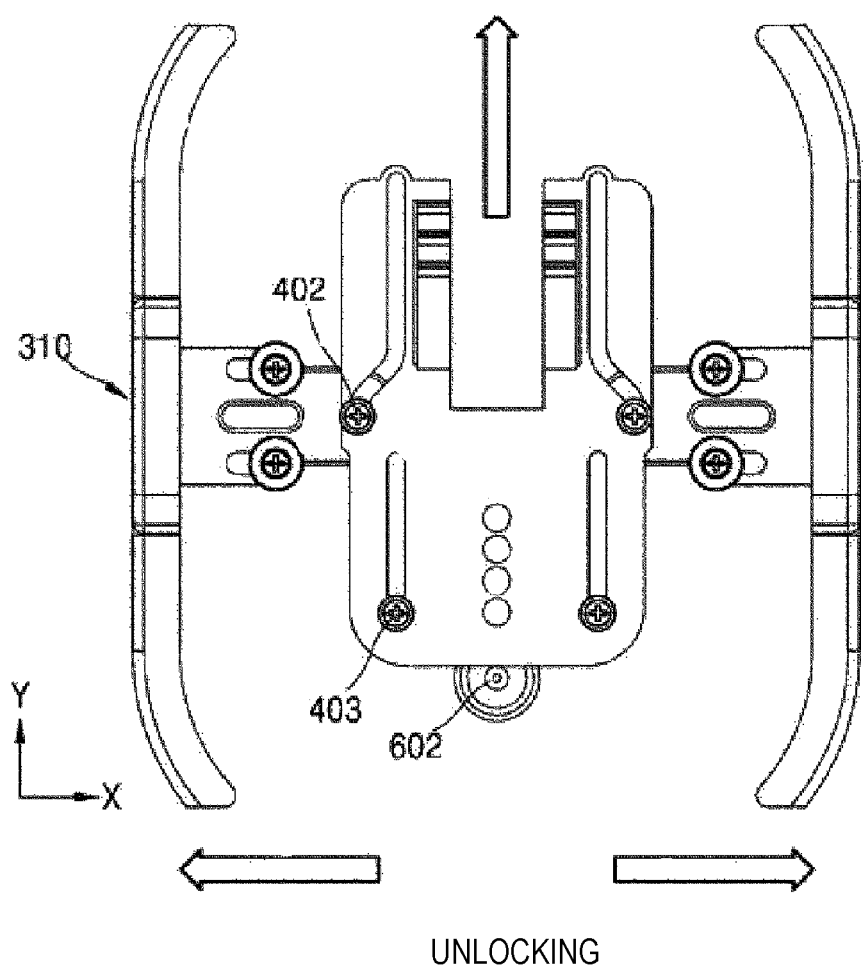

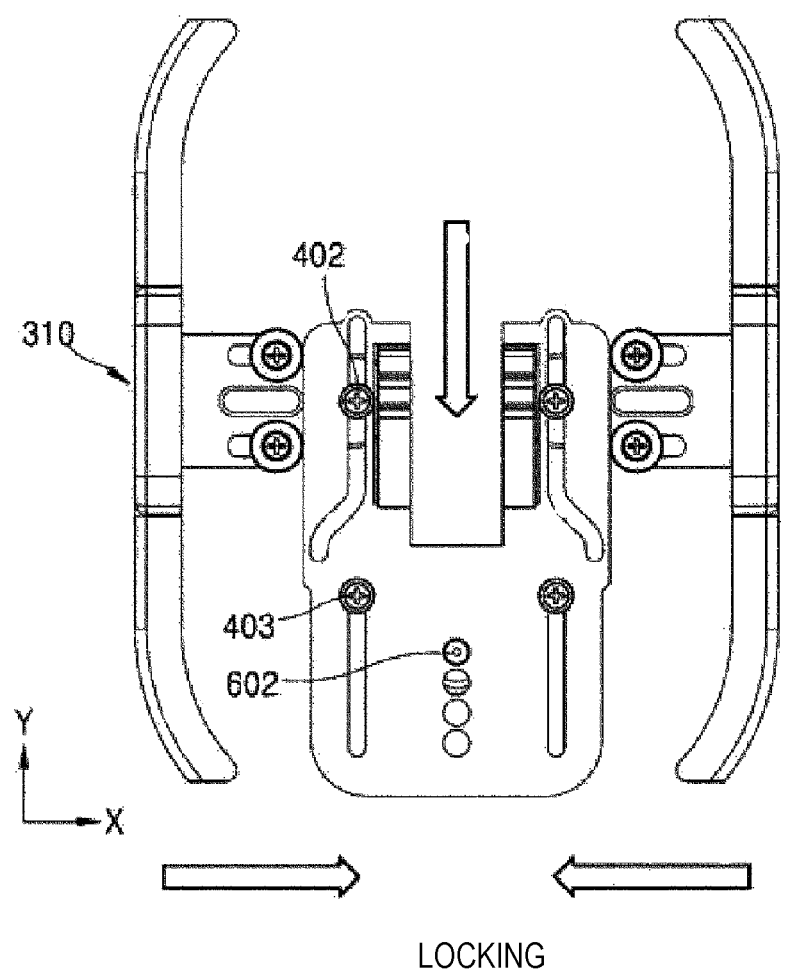

COOKING DEVICE

CROSS-REFERENCE TO RELATED APPLICATION

This application is the National Phase of PCT International Application No. PCT/KR2022/008396, filed on Jun. 14, 2022, which claims the benefit of Korean Application No. 10-2021-0077038 filed on Jun. 14, 2021, which is hereby incorporated by reference herein in their entirety.

BACKGROUND

Technical Field

The present invention relates to a cooking device, and more particularly, to a cooking device that can safely cook cooking ingredients.

BACKGROUND ART

In general, as a representative example of a cooking device, an electric pressure rice cooker is a device capable of selectively performing a cooking function for cooking rice and a warming function for maintaining cooked rice at a constant temperature. In the electric pressure rice cooker, a main body lid, in which a steam discharge hole is formed on a top of a main body, may be installed on the main body so as to be openable/closable, an inner pot may be detachably built in an inside of the main body, and an inner pot lid may be separately provided so as to cover the inner pot. An inside of the inner pot is provided with an induction heating type heater or a heating plate type heater which transfers heat to the cooking ingredients accommodated in the inner pot, that is, rice, mixed grains, or other food ingredients, so that the cooking ingredients can be cooked.

SUMMARY

The object to be solved by the technical idea of the present invention is to provide a cooking device that can be safely used even when a lid is not completely closed.

To achieve the above object, a cooking device according to an embodiment of the present invention includes: a main body in which an inner pot is accommodated; a top plate provided in a lid cover coupled to the main body; a locking slide coupled on the top plate so as to be linearly movable in a first direction; and a locking structure including an engagement protrusion which is configured to be engaged with a flange portion of the inner pot. The locking structure is configured to be linearly moved, depending on a position of the locking slide performing a linear movement in the first direction, between a locking position where the engagement protrusion is positioned so as to overlap with the flange portion of the inner pot in a vertical direction and an unlocking position spaced apart from the locking position toward an outside of the top plate.

Further, the locking slide includes a guide groove which includes a first region formed in parallel with the first direction and a second region formed in a direction crossing the first direction. The locking structure is connected to a fastening member which is accommodated in the guide groove and is positioned to one of the first region and the second region as the locking slide is moved in the first direction.

Further, the second region is formed in a direction away from an inside of the locking slide. When the fastening member is positioned to the first region, the locking structure is positioned to the locking position, and, when the fastening member is positioned to the second region, the locking structure is positioned to the unlocking position.

Further, the cooking device further includes an inner flow path communicating with an accommodation space of the inner pot, a pressure adjusting rod adjusting a pressure of the inner pot by blocking the inner flow path, and a pressure controller configured to adjust the pressure of the inner pot by changing a degree to which the pressure adjusting rod blocks the inner flow path depending on a height of a pressure adjusting protrusion protruding outward. The locking slide includes a multi-step structure having a plurality of step portions having different heights. As the locking slide is linearly moved in the first direction, the pressure adjusting protrusion is positioned at different heights by the plurality of step portions of the multi-step structure.

Further, the locking slide includes a guide groove which includes a first region formed in parallel with the first direction and a second region formed in a direction crossing the first direction. The locking structure is connected to a fastening member which is accommodated in the guide groove and is positioned to one of the first region and the second region as the locking slide is moved in the first direction. The pressure controller adjusts a pressure of the inner pot to a first pressure when the fastening member is positioned to the first region, and adjusts the pressure of the inner pot to a second pressure when the fastening member is positioned to the second region. The first pressure is higher than the second pressure.

Further, the cooking device further includes a safety structure which is disposed on an upper surface of the top plate and includes a safety protrusion receiving an elastic force in a vertical direction by an elastic member. The locking slide includes a plurality of restricting grooves into which the safety protrusion is fittable depending on the position of the locking slide.

The cooking device according to the technical idea of the present disclosure can provide safety in use by guiding the steam pressure of the inner pot to the outside even when the lid is not completely closed.

Further, the cooking device can provide a function of adjusting the pressure of the inner pot in several stages through the multi-step structure.

BRIEF DESCRIPTION OF THE DRAWINGS

FIG. 7B is a view illustrating an unlocking process according to an exemplary embodiment of the present disclosure.

FIG. 7C is a view illustrating a locking process according to an exemplary embodiment of the present disclosure.

DETAILED DESCRIPTION

Figure 1:
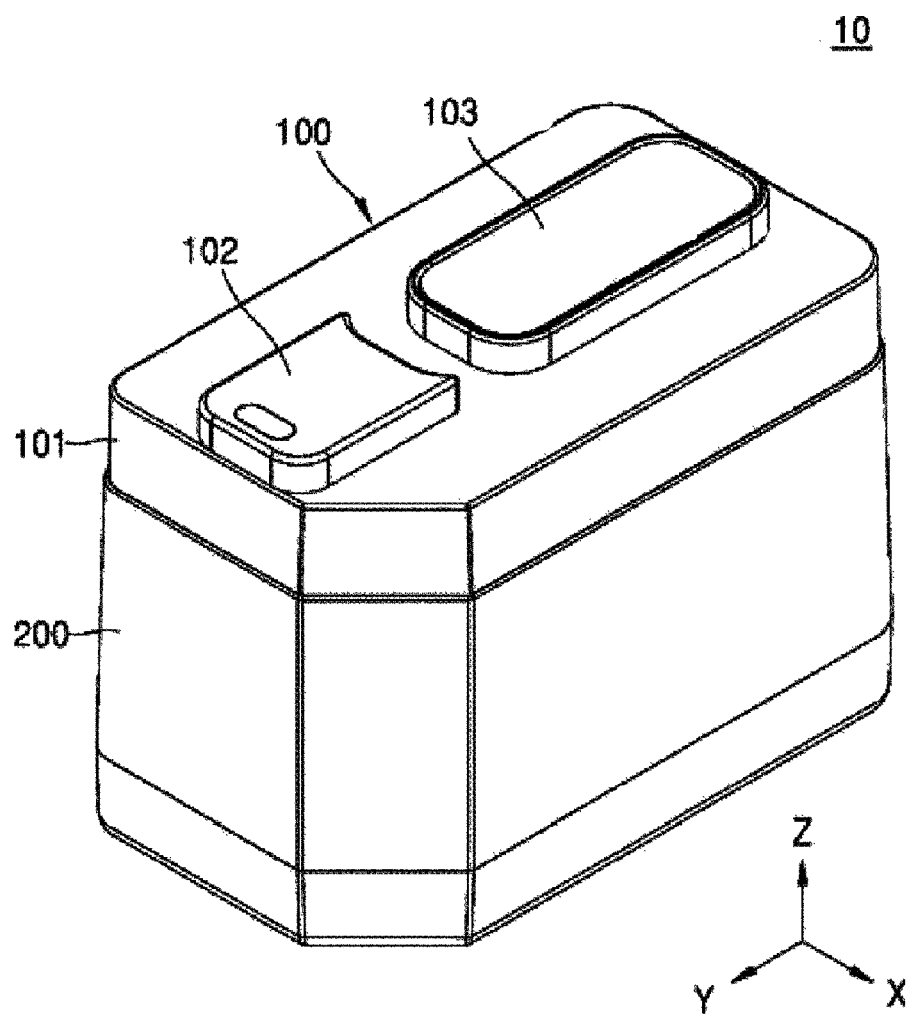
FIG. 1 is a perspective view showing a cooking device 10 according to exemplary embodiments of the present invention.

Hereinafter, preferred embodiments of the present disclosure are described in detail with reference to the accompanying drawings. The same reference numerals are used for the same components in the drawings, and duplicate descriptions thereof will be omitted.

Figure 2:
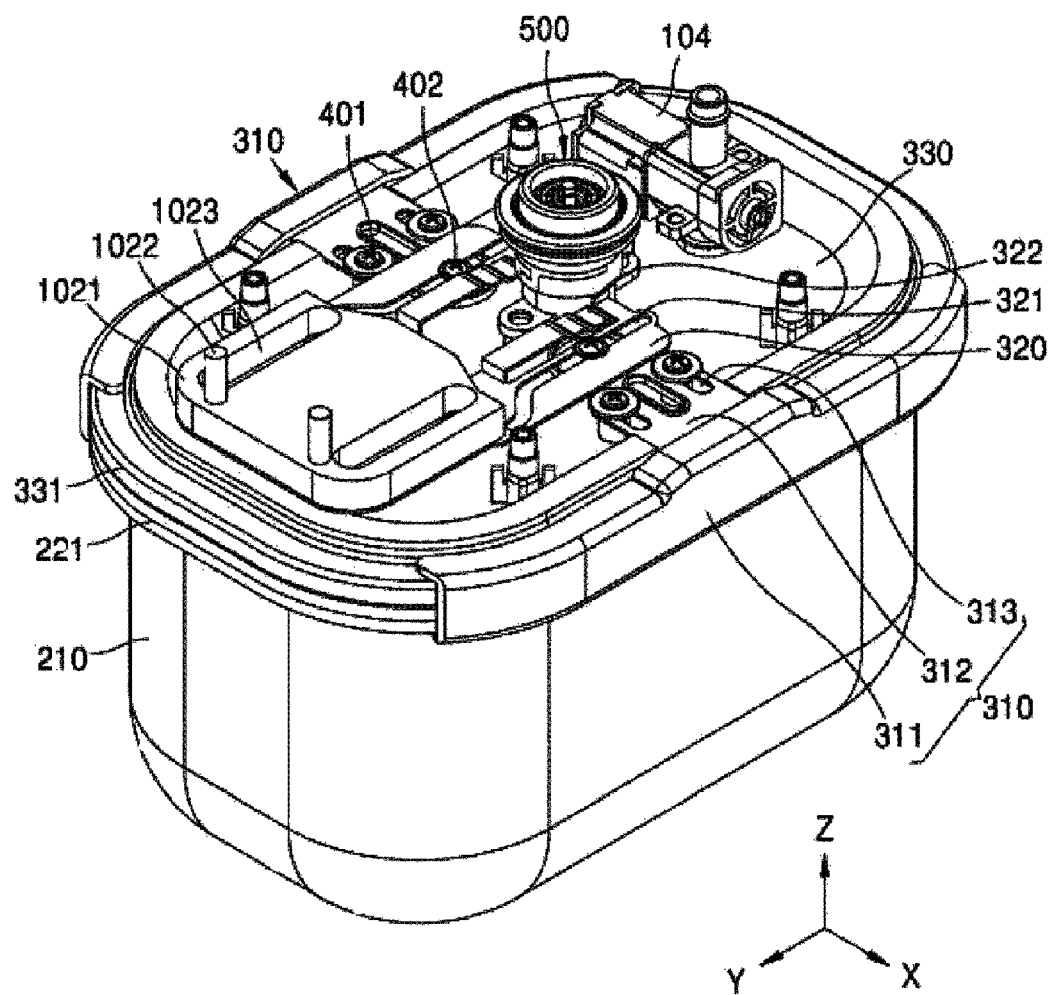
FIG. 2 is a perspective view showing an internal structure of the cooking device 10.
Figure 3:
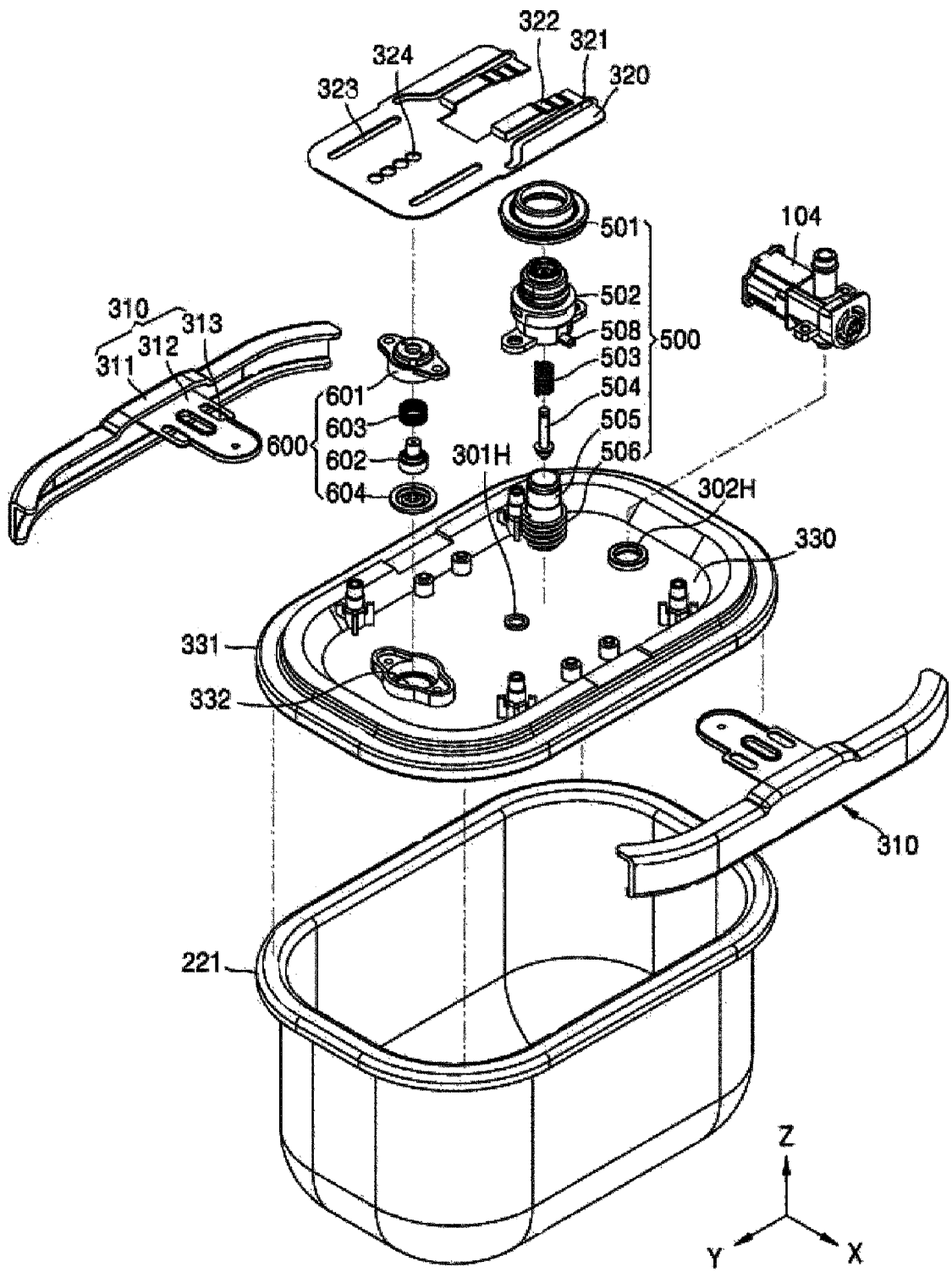
FIG. 3 is an exploded perspective view showing the internal structure of the cooking device 10.

FIG. 1 is a perspective view showing a cooking device 10 according to exemplary embodiments of the present invention. FIG. 2 is a perspective view showing an internal structure of the cooking device 10. FIG. 3 is an exploded perspective view showing the internal structure of the cooking device 10.

Referring to FIGS. 1 to 3, the cooking device 10 may include a main body 200 including a cooking space in which cooking ingredients can be cooked, and a lid assembly 100 installed on the main body 200.

The main body 200 may accommodate an inner pot 210 configured to accommodate cooking ingredients. The inner pot 210 may have a shape of a container and may have an accommodation space in which cooking ingredients are accommodated. The inner pot 210 may be detachably loaded in the cooking space of the main body 200. In exemplary embodiments, the inner pot 210 may include, at its upper end rim, a flange portion 221 that protrudes outward. The flange portion 221 may extend along the upper end rim of the inner pot 210. In some embodiments, a plurality of flange portions 221, which are spaced apart from each other along the upper end rim of the inner pot 210, may be disposed at the upper end of the inner pot 210. The main body 200 may include a heating source for heating the cooking ingredients accommodated in the inner pot 210. For example, the main body 200 may include a heating plate type heater or a heater operating as an induction heating type. The inner pot 210 according to an embodiment of the present invention may have a rectangular shape with rounded corners when viewed in a Z-axis direction.

The lid assembly 100 may cover the cooking space of the main body 200 and/or the accommodation space of the inner pot 210. The lid assembly 100 may be configured to seal the accommodation space of the inner pot 210 and/or the cooking space of the main body such that a pressure suitable for cooking is formed in the accommodation space of the inner pot 210 while the cooking ingredients are being cooked. In exemplary embodiments, the lid assembly 100 may be hingedly coupled to one side portion of the main body 200 and may be rotated about a hinge shaft. The lid assembly 100 may be rotated between a closed position where the lid assembly covers the accommodation space of the inner pot 210 and an open position where the lid assembly opens the accommodation space of the inner pot 210. In exemplary embodiments, the lid assembly 100 may be detachably coupled to the main body.

The lid assembly 100 may include a lid cover 101, a manipulation handle 102, a pressure adjusting cover 103, a top plate 330, a locking slide 320, and a locking structure 310.

The lid cover 101 may be coupled to the main body 200. The lid cover 101 may form the exterior of the lid assembly 100. The lid cover 101 may provide, at its inside, a space where various electric components can be installed.

The top plate 330 may cover the top of the main body 200. The top plate 330 may be disposed in the lid cover 101 and may be coupled to the lid cover 101. The top plate 330 may include a first steam hole 301H and a second steam hole 302H which communicate with the inner pot 210.

The locking slide 320 may be disposed on the top plate 330. The locking slide 320 may be coupled to the top plate 330 so as to be moved in a substantially linear direction on the top plate 330. The locking slide 320 may be configured to be moved in a Y-axis direction or a negative Y-axis direction on the top plate 330, but the embodiments are not limited thereto. The locking slide may be configured to be moved in an X-axis direction or a negative X-axis direction.

The locking slide 320 may be configured to be moved in conjunction with a linear motion of the manipulation handle 102 protruding from the lid cover 101. Specifically, the manipulation handle 102 is connected to a power transmission structure 1021 and can be moved linearly, and the locking slide 320 is connected to the power transmission structure 1021 and can be moved linearly. For example, the movement of the manipulation handle 102 in the Y-axis direction may cause the locking slide 320 to be moved in the Y-axis direction, and the movement of the manipulation handle 102 in the negative Y-axis direction may cause the locking slide 320 to be moved in the negative Y-axis direction.

More specifically, the manipulation handle 102 may be integrally assembled with the power transmission structure 1021 through a protruding portion 1022 protruding upward from the power transmission structure 1021. The power transmission structure 1021 may have a power transmission groove 1023 perforated through a body of the power transmission structure 1021 in a Z-axis direction. A fastening member, such as a screw (e.g., a third fastening member 403 in FIG. 7A), may be inserted into the power transmission groove 1023, and the fastening member may be inserted into a movement restricting groove 323 of the locking slide 320. That is, the power transmission structure 1021 and the locking slide 320 may be fastened to each other through the fastening member.

The locking slide 320 may be configured to be moved on the top plate 330 within a predetermined movement range. The movement restricting groove 323 can guide the linear movement of the locking slide 320, and can restrict the movement range of the locking slide 320.

A solenoid valve 104 and a pressure controller 500 may be accommodated in the pressure adjusting cover 103.

The solenoid valve 104 and the pressure controller 500 may be mounted on the top plate 330. The solenoid valve 104 may be configured to adjust the pressure of the accommodation space of the inner pot 210 by discharging steam in the accommodation space of the inner pot 210 in response to an electrical control signal. The solenoid valve 104 may include an inner flow path communicating with the accommodation space of the inner pot 210 through the second steam hole 302H, and may be configured to selectively open and close the inner flow path in response to an electrical control signal. For example, the solenoid valve 104 may be configured to rapidly discharge the residual pressure in the inner pot 210 to the outside by opening the inner flow path when cooking is completed.

The pressure controller 500 may be configured to control the pressure of the accommodation space of the inner pot 210 by controlling the discharge of steam depending on the pressure level of the accommodation space of the inner pot 210. The pressure controller 500 may have a flow path communicating with the accommodation space of the inner pot 210 through the first steam hole 301H, and may be configured to selectively discharge the steam introduced into the flow path. The pressure controller 500 may include a flow path, the opening and closing of which is adjusted depending on a multi-step structure 322 formed in the locking slide 320, and the pressure controller 500 may adjust the pressure of the inner pot 210 in several stages by the opening and closing of the flow path. In exemplary embodiments, the pressure controller 500 can adjust the pressure of the inner pot 210 in four stages. For example, each of the pressures in the four stages may be a pressure between atmospheric pressure and 2.4 kgf/cm$^2$.

A safety structure 600 may be mounted on the top plate 330. Specifically, the safety structure 600 may be seated in a restriction groove 332 formed in the top plate 330. The safety structure 600 may include a structure cover 601, a safety protrusion 602, an elastic member 603, and a support member 604. The structure cover 601 forms the exterior of the safety structure 600 and may include a groove for guiding a movement of the safety protrusion 602 in the Z-axis direction. The elastic member 603 may be disposed on an upper portion of the safety protrusion 602, and may push the safety protrusion 602 in the Z-axis direction. The safety protrusion 602 may receive elastic force from the elastic member 603 and may be moved in the Z-axis direction through a groove of the structure cover 601. The safety protrusion 602 may rise to a position higher than a height of the structure cover 601. The support member 604 may be located between the elastic member 603 and the restriction groove 332.

The locking slide 320 may include a safety groove 324. The safety groove 324 may be a space in which the safety protrusion 602 of the safety structure 600 is accommodated. In the fitted state where the safety protrusion 602 is accommodated in the safety groove 324, the pressure controller 500 can uniformly maintain the pressure of the inner pot 210. A plurality of (e.g., four) safety grooves 324 may be provided. Whenever the safety protrusion 602 is accommodated in each of the plurality of safety grooves 324, the pressure controller 500 can adjust the pressure of the inner pot 210 differently. In the fitted state where the safety protrusion 602 is accommodated in the safety grooves 324, the movement of the locking slide 320 may be somewhat restricted. However, in the case where an external force, which causes the locking slide 320 to push the safety protrusion 602 downward by the manipulation handle 102, becomes greater than the elastic force of the elastic member 603 pushing the safety protrusion 602 upward, the locking slide 320 may be moved in the Y-axis direction.

The locking slide 320 may include a guide groove 321 extending approximately along the movement direction of the locking slide 320, and a connection plate 312 of the locking structure 310 may be connected to a second fastening member 402 inserted into the guide groove 321. While the locking slide 320 is moved, for example, in the Y-axis direction, a linear movement of the locking structure 310 in the X-axis direction can be realized by physical interference between the locking slide 320 and the second fastening member 402 inserted into the guide groove 321.

The locking structure 310 may include a locking blade 311 and the connection plate 312, which is disposed between the top plate 330 and the locking slide 320. The connection plate 312 may include a groove 313 extending in a linear direction. A first fastening member 401 such as a screw may be inserted into the groove 313 of the connection plate 312, and the first fastening member 401 may be fixed to the top plate 330. The groove 313 of the connection plate 312 can guide the linear movement of the locking structure 310 in the X-axis direction, and can restrict the movement range of the locking structure 310.

The locking structure 310 may be mounted on the top plate 330 and may include engagement protrusions (3111 and 3113 in FIG. 6A) configured to be selectively engaged with the flange portion 211 of the inner pot 210 and a rim portion 331 of the top plate 330. A locking position of the locking structure 310 may be a position where the engagement protrusions 3111 and 3113 of the locking structure 310 overlap with the flange portion 211 of the inner pot 210 in a vertical direction, and an unlocking position of the locking structure 310 may be a position where the engagement protrusions 3111 and 3113 of the locking structure 310 do not overlap with the flange portion 211 of the inner pot 210 in the vertical direction. While cooking of the cooking ingredients contained in the inner pot 210 is in progress, the locking structure 310 is positioned to the locking position. Further, as the engagement protrusions 3111 and 3113 are fixed to the inner pot 210 and the rim portion 331, the inner pot 210 and the top plate 330 can be firmly fixed to each other. The locking structure 310 may be described in detail with reference to drawings to be described below.

Figure 4:
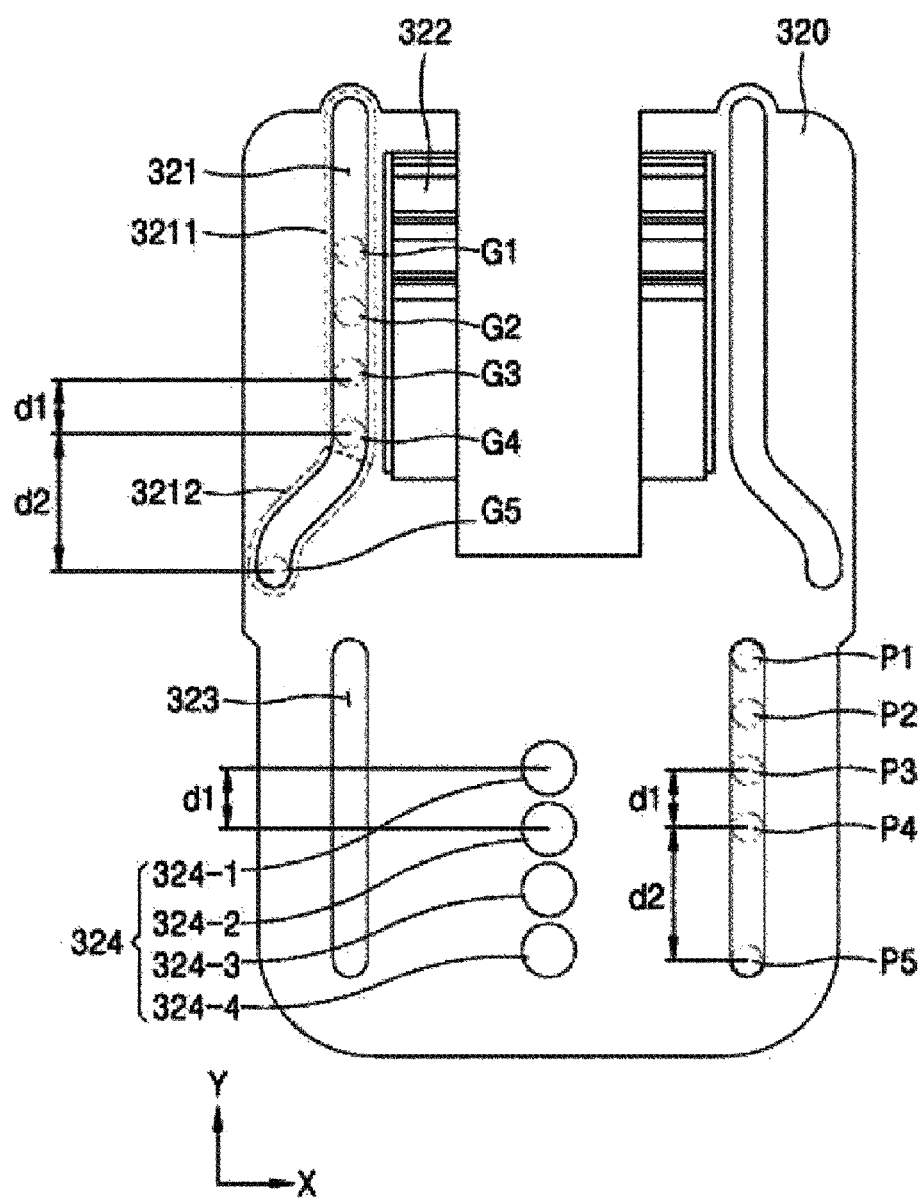
FIG. 4 is a view illustrating a locking slide 320 according to an exemplary embodiment of the present disclosure.
Figure 5:
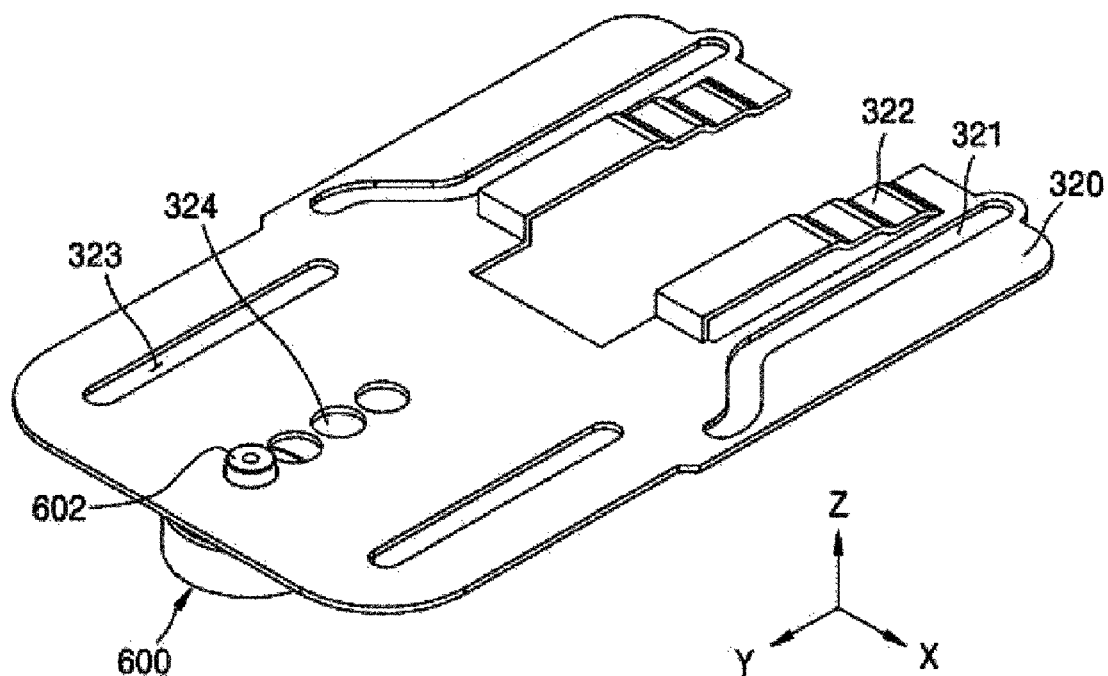
FIG. 5 is a view illustrating a locking slide 320 and a safety structure 600 according to an exemplary embodiment of the present disclosure.
Figure 6A:
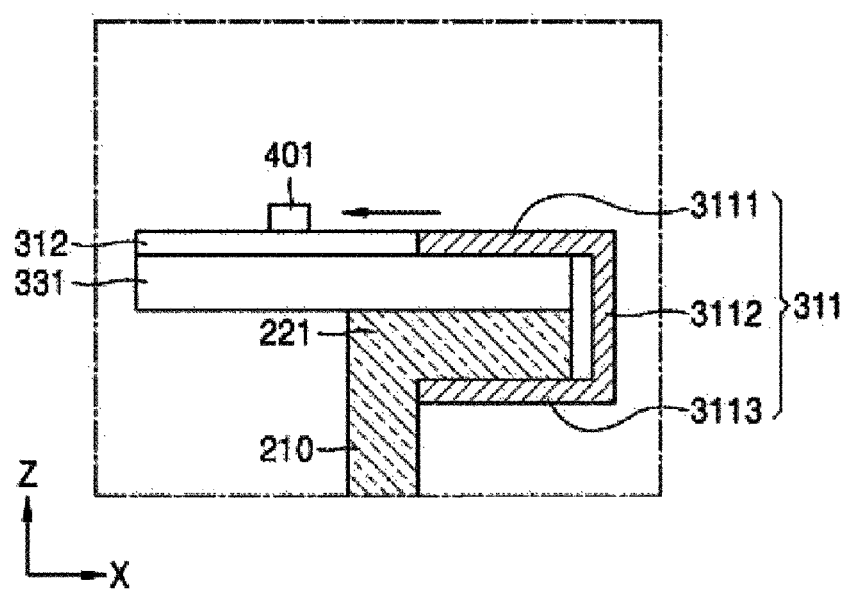
FIGS. 6A and 6B are cross-sectional views showing an operation of a locking structure according to a movement of the locking slide.
Figure 6B:
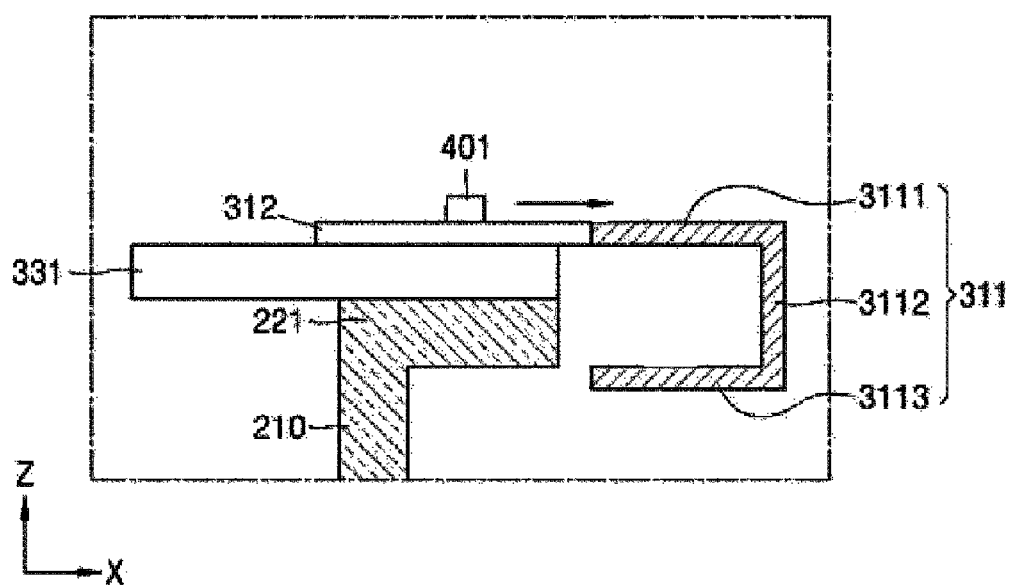
Figure 7A:
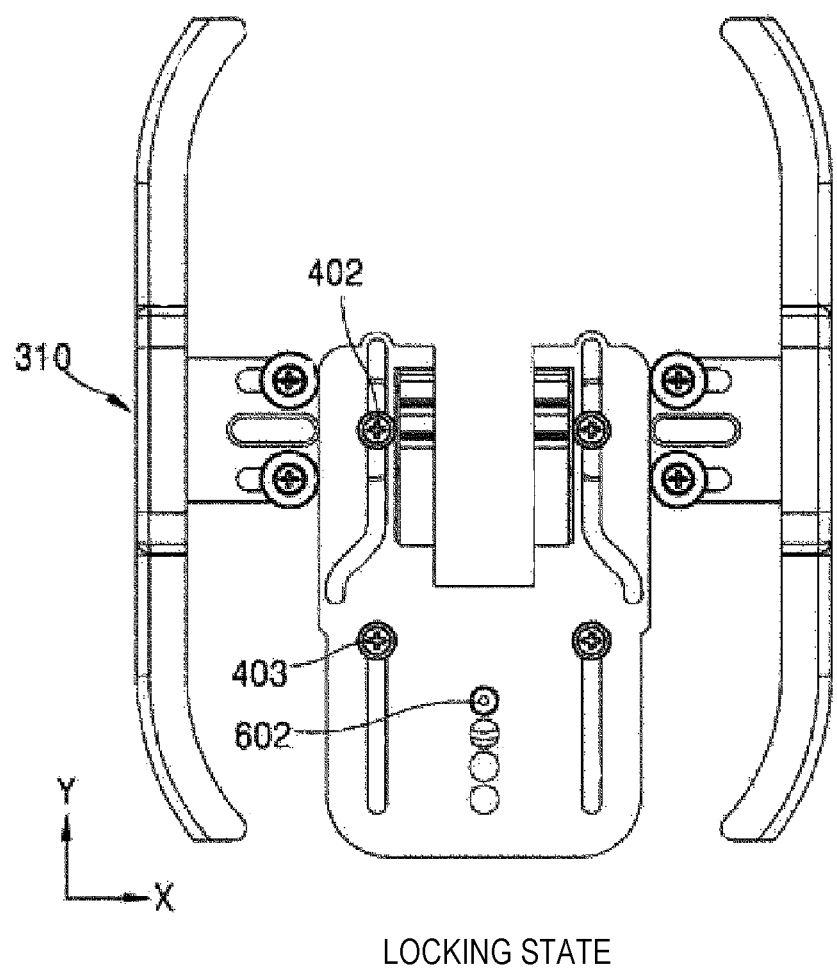
FIG. 7A is a view illustrating a locking state according to an exemplary embodiment of the present disclosure.

FIG. 4 is a view illustrating the locking slide 320 according to an exemplary embodiment of the present disclosure. FIG. 5 is a view illustrating the locking slide 320 and the safety structure 600 according to an exemplary embodiment of the present disclosure. FIGS. 6A and 6B are cross-sectional views showing an operation of the locking structure according to the movement of the locking slide. Specifically, FIG. 6A shows a state where the locking structure 310 is located at the locking position, and FIG. 6B shows a state where the locking structure 310 is located at the unlocking position. FIG. 7A is a view illustrating a locking state according to an exemplary embodiment of the present disclosure, FIG. 7B is a view illustrating an unlocking process according to an exemplary embodiment of the present disclosure, and FIG. 7C is a view illustrating a locking process according to an exemplary embodiment of the present disclosure.

Referring to FIGS. 4 and 5, the locking slide 320 may include the guide groove 321, the multi-step structure 322, the movement restricting groove 323, and the safety groove 324.

The second fastening member 402 to be fastened to the connection plate 312 of the locking structure 310 may be inserted into the guide groove 321. The guide groove 321 may include a safety region 3211 formed in parallel with the Y-axis direction, and an opening/closing region 3212 crossing the Y-axis direction and formed in a direction away from the inside of the locking slide 320. For example, the safety region 3211 may include first to fourth locking positions (or first to fourth guide positions) G1 to G4, and the opening/closing region 3212 may include a fifth locking position (or a fifth guide position) G5. The first to fourth locking positions G1 to G4 may be spaced apart from each other by a first distance d1, and the fourth locking position G4 and the fifth locking position G5 may be spaced apart from each other by a second distance d2.

The second fastening member 402 may be positioned anywhere in the guide groove 321. For example, the second fastening member 402 may be positioned to the first to fifth locking positions G1 to G5. For ease of description, the relative position of the second fastening member 402 is shown with reference to an image in which the locking slide 320 is stopped. However, in practice, it will be obviously understood by a person of ordinary skill in the technical field that the second fastening member 402 may be connected and fixed to the top plate 330 and the locking slide 320 is moved in conjunction with the manipulation handle 102.

A third fastening member (e.g., 403 in FIG. 7A) may be inserted into the movement restricting groove 323. The third fastening member 403 may be positioned anywhere in the movement restricting groove 323. For example, the third fastening member 403 may be positioned to the first to fifth movement positions P1 to P5. The first to fourth movement positions P1 to P4 may be spaced apart from each other by the first distance d1, and the fourth movement position P4 and the fifth movement position P5 may be spaced apart from each other by the second distance d2.

The safety protrusion 602 may be inserted into the safety groove 324. The safety groove 324 may consist of a plurality of grooves, and may include, for example, first to fourth safety grooves 324-1 to 324-4. When the safety protrusion 602 is inserted into one of the first to fourth safety grooves 324-1 to 324-4, the movement of the locking slide 320 may be somewhat restricted. However, where an external force equal to or greater than a standard magnitude is applied to the locking slide 320 in the Y-axis direction by the manipulation handle 102, the safety protrusion 602 may move to another safety groove. The first to fourth safety grooves 324-1 to 324-1 may be spaced apart from each other by the first distance d1.

Referring to FIGS. 6A and 6B, the locking structure 310 may include the locking blade 311 having a shape extending along the rim portion 331 of the top plate 330. The locking blade 311 may include: a side wall portion 3112 that surrounds the rim portion 331 of the top plate 330 and the flange portion 221 of the inner pot 210 in a lateral direction; an upper engagement protrusion 3111 extending inward from an upper end portion of the side wall portion 3112 and making contact with an upper end portion of the rim portion 331 of the top plate 330; and a lower engagement protrusion 3113 extending inward from a lower end portion of the side wall portion 3112 and making contact with a lower end portion of the flange portion 221. That is, the upper engagement protrusion 3111 may be configured to be engaged with and fixed to the rim portion 331 of the top plate 330, and the lower engagement protrusion 3113 may be configured to be engaged with and fixed to the flange portion 221 of the inner pot 210.

Referring to FIGS. 4, 6A, and 7A, when the second fastening member 402 is positioned to the safety region 3211, for example, to the first to fourth guide positions G1 to G4, the locking structure 310 may be in the locking state. That is, when the second fastening member 402 is positioned to the safety region 3211, the upper engagement protrusion 3111 is engaged with and fixed to the rim portion 331, and the lower engagement protrusion 3113 may be engaged with and fixed to the flange portion 221.

Referring to FIGS. 4, 6B, and 7B, when the locking slide 320 is moved in the Y-axis direction, the second fastening member 402 may be moved to the opening/closing region 3212, for example, the fifth guide position G5, and the locking structure 310 may be in the unlocking state. That is, when the second fastening member 402 is positioned to the opening/closing region 3212, the engagement and fixation of the upper engagement protrusion 3111 with respect to the rim portion 331 may be released, and the engagement and fixation of the lower engagement protrusion 3113 with respect to the flange portion 221 may be released. The locking structure 310 may be moved in a direction away from the rim portion 331 and the flange portion 221. In the unlocking state, the safety protrusion 602 may make contact with a side surface of the locking slide 320.

Referring to FIGS. 4, 6B, and 7C, when the locking slide 320 is moved in the negative Y-axis direction, the second fastening member 402 may be moved to the safety region 3211, for example, to the first guide position G1, and the locking structure 310 may be in the locking state. The locking structure 310 may be moved in a direction that approaches the rim portion 331 and the flange portion 221. In the locking state, the safety protrusion 602 may be inserted into the first to fourth safety grooves 324-1 to 324-4.

Figure 8:
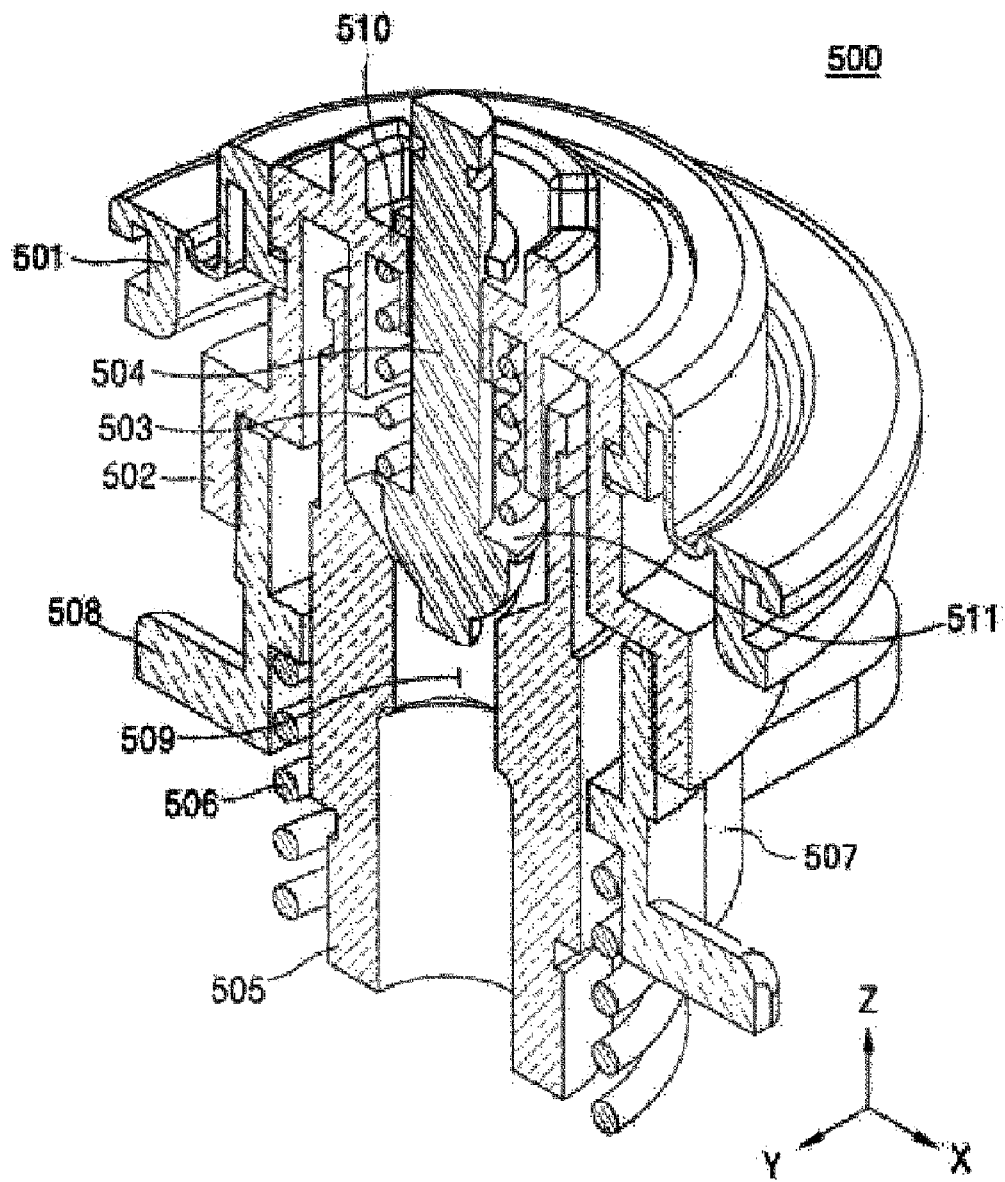
FIG. 8 is a view illustrating a pressure controller 500 according to an exemplary embodiment of the present disclosure.

FIG. 8 is a view illustrating the pressure controller 500 according to an exemplary embodiment of the present disclosure.

Referring to FIGS. 3 and 8, the pressure controller 500 may include an upper cylinder 502, a lower cylinder 505, a pressure adjusting rod 504, a first elastic member 503, a second elastic member 506, a pressure adjusting structure 507, a pressure adjusting protrusion 508, and an upper cap 501.

The lower cylinder 505 may be connected to the first steam hole 301H and may form a flow path 509 with which steam of the inner pot 210 communicates. The pressure adjusting structure 507 may have a shape surrounding the exterior of the lower cylinder 505. The pressure adjusting structure 507 may be supported from the top plate 330 by the second elastic member 506, and may be in the state of receiving an external force in the Z-axis direction by the second elastic member 506. The pressure adjusting protrusion 508 may be formed outwardly of the pressure adjusting structure 507.

The upper cylinder 502 may be formed on the pressure adjusting structure 507, and the pressure adjusting rod 504 may be located in an inner space of the upper cylinder 502. The pressure adjusting rod 504 may be configured to open and close the flow path 509 of the lower cylinder 505. The pressure adjusting rod 504 may be moved in the Z-axis direction by steam moving in the Z-axis direction through the flow path 509. Since the steam inside the inner pot 210 can escape to the outside by the movement of the pressure adjusting rod 504, the pressure of the inner pot 210 can be determined depending on the force with which the pressure adjusting rod 504 blocks the flow path 509.

The first elastic member 503 may be located between an upper support surface 510 of the upper cylinder 502 and a lower support surface 511 of the pressure adjusting rod 504. The first elastic member 503 can hinder the pressure adjusting rod 504 from being moved in the Z-axis direction by steam. As the upper cylinder 502 is formed at a higher place, the height of the upper support surface 510 may increase, and the elastic force transmitted by the first elastic member 503 to the lower support surface 511 may decrease. Therefore, as the height of the upper cylinder 502 increases, the pressure inside the inner pot 210 may decrease.

FIGS. 9A to 9D are views illustrating a pressure adjusting process according to an exemplary embodiment of the present disclosure. FIGS. 9A to 9D may be referred to together with FIGS. 3, 5, and 8 in the following description.

Figure 9A:
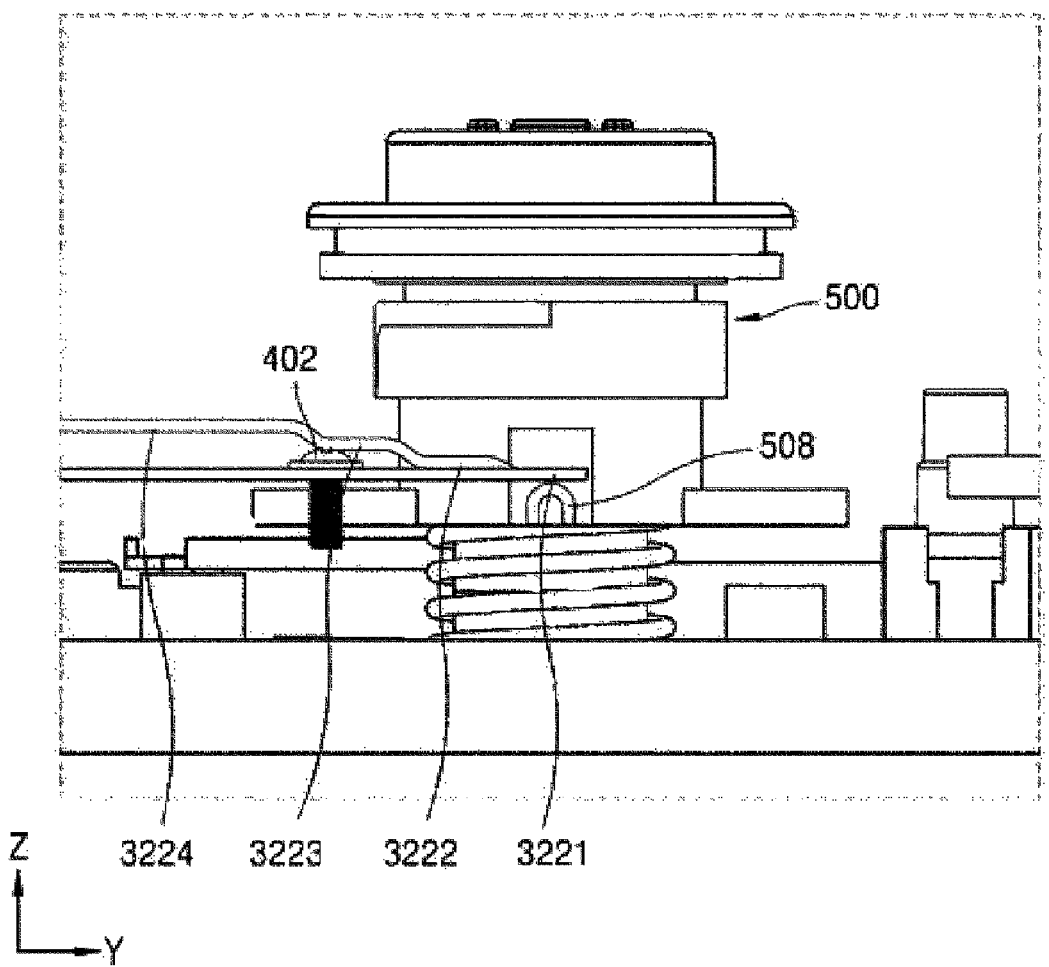
FIGS. 9A to 9D are views illustrating a pressure adjusting process according to an exemplary embodiment of the present disclosure.

Referring to FIGS. 3, 5, and 9A, the multi-step structure 322 may include first to fourth step portions 3221 to 3224. The first to fourth step portions 3221 to 3224 may have surfaces the height of which increases sequentially. That is, a height of the second step portion 3222 may be higher than a height of the first step portion 3221, a height of the third step portion 3223 may be higher than the height of the second step portion 3222, and a height of the fourth step portion 3224 may be higher than the height of the third step portion 3223.

Referring to FIGS. 3 and 9A, the pressure controller 500 may include the pressure adjusting protrusion 508. The pressure adjusting protrusion 508 may be formed in the pressure adjusting structure 507 and may be a structure protruding in an outward direction of an outer periphery of the pressure adjusting structure 507.

Referring to FIGS. 9A to 9D, the pressure adjusting protrusion 508 may be positioned under the first to fourth step portions 3221 to 3224. Since the pressure adjusting structure 507 receives the external force in the Z-axis direction due to the second elastic member 506, even when the locking slide 320 is moved in the Y-axis direction, the pressure adjusting protrusion 508 can be positioned so as to make contact with each of the first to fourth step portions 3221 to 3224.

FIG. 9A may be a view illustrating that the pressure adjusting protrusion 508 is positioned under the first step portion 3221 when the second fastening member 402 of FIG. 4 is positioned to the first guide position G1. The pressure adjusting protrusion 508 is integrally formed with the pressure adjusting structure 507, and referring to FIG. 8, the pressure adjusting structure 507 can determine the height of the upper cylinder 502. As described above with reference to FIG. 8, as the height of the upper cylinder 502 increases, the pressure inside the inner pot 210 may decrease. When the pressure adjusting protrusion 508 makes contact with a lower surface of the first step portion 3221, the pressure inside the inner pot 210 can be maintained at a first pressure. That is, when the second fastening member 402 is positioned to the first guide position G1, the pressure inside the inner pot 210 can be maintained at the first pressure.

Figure 9B:
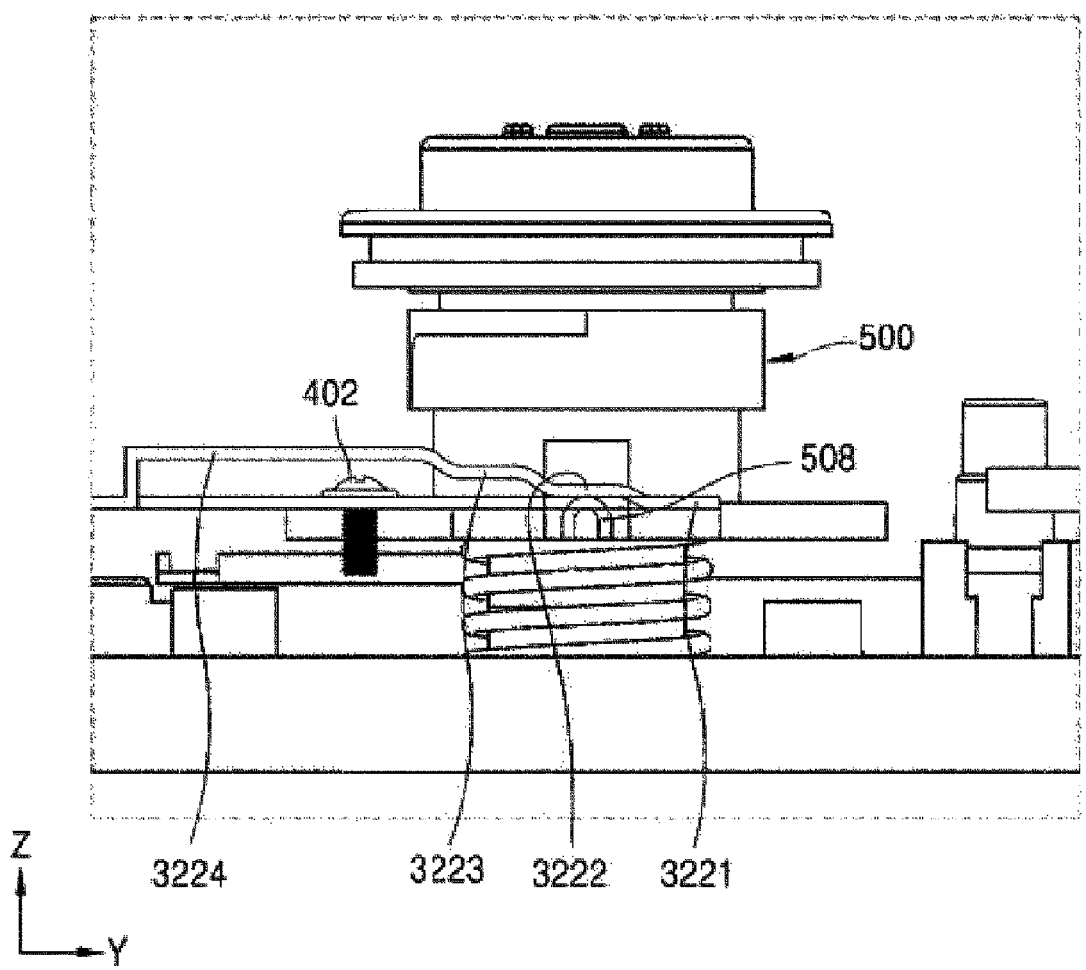

FIG. 9B may be a view illustrating that the pressure adjusting protrusion 508 is positioned under the second step portion 3222 when the second fastening member 402 of FIG. 4 is positioned to the second guide position G2. As the height of the upper cylinder 502 increases, the pressure inside the inner pot 210 may decrease. Therefore, when the pressure adjusting protrusion 508 makes contact with a lower surface of the second step portion 3222, the pressure inside the inner pot 210 can be maintained at a second pressure, and the second pressure may be lower than the first pressure.

Figure 9C:
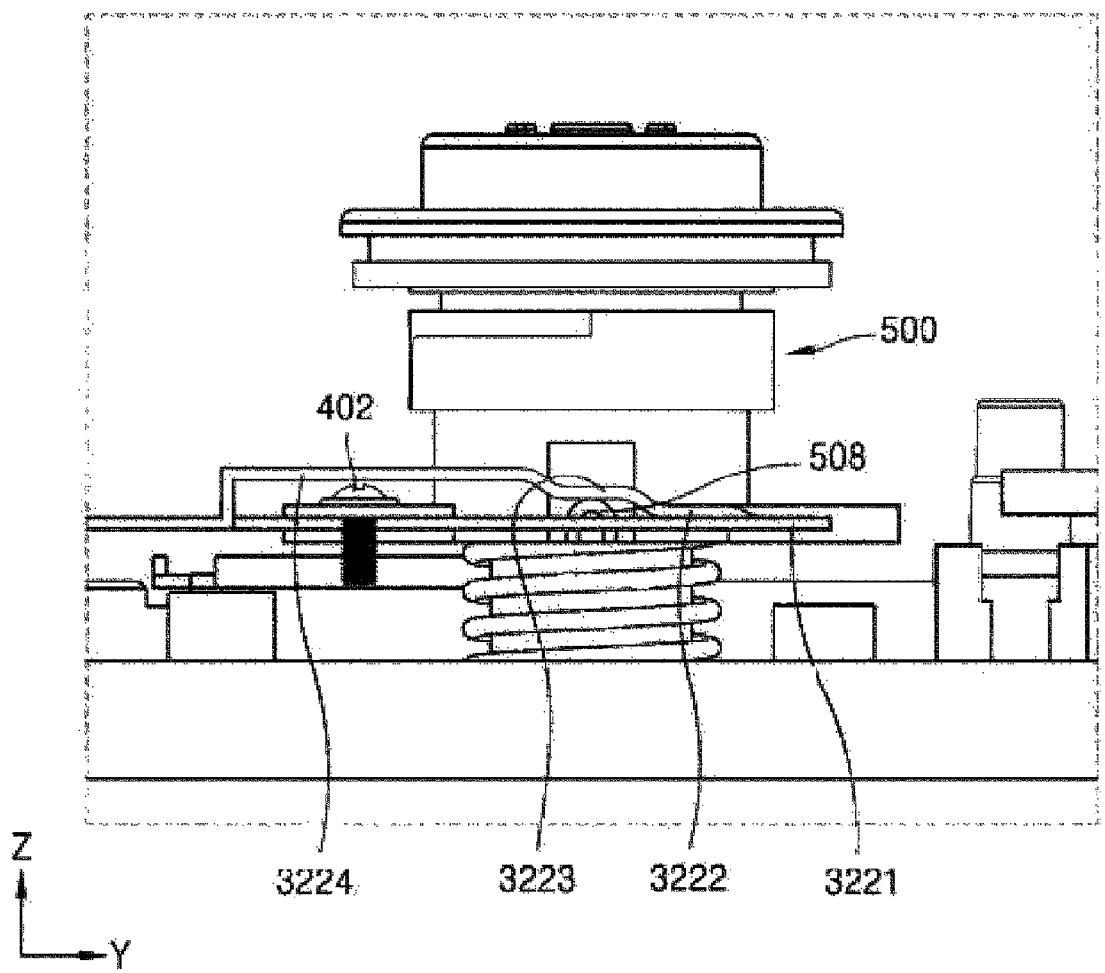

FIG. 9C may be a view illustrating that the pressure adjusting protrusion 508 is positioned under the third step portion 3223 when the second fastening member 402 of FIG. 4 is positioned to the third guide position G3. As the height of the upper cylinder 502 increases, the pressure inside the inner pot 210 may decrease. Therefore, when the pressure adjusting protrusion 508 makes contact with a lower surface of the third step portion 3223, the pressure inside the inner pot 210 can be maintained at a third pressure, and the third pressure may be lower than the second pressure.

Figure 9D:
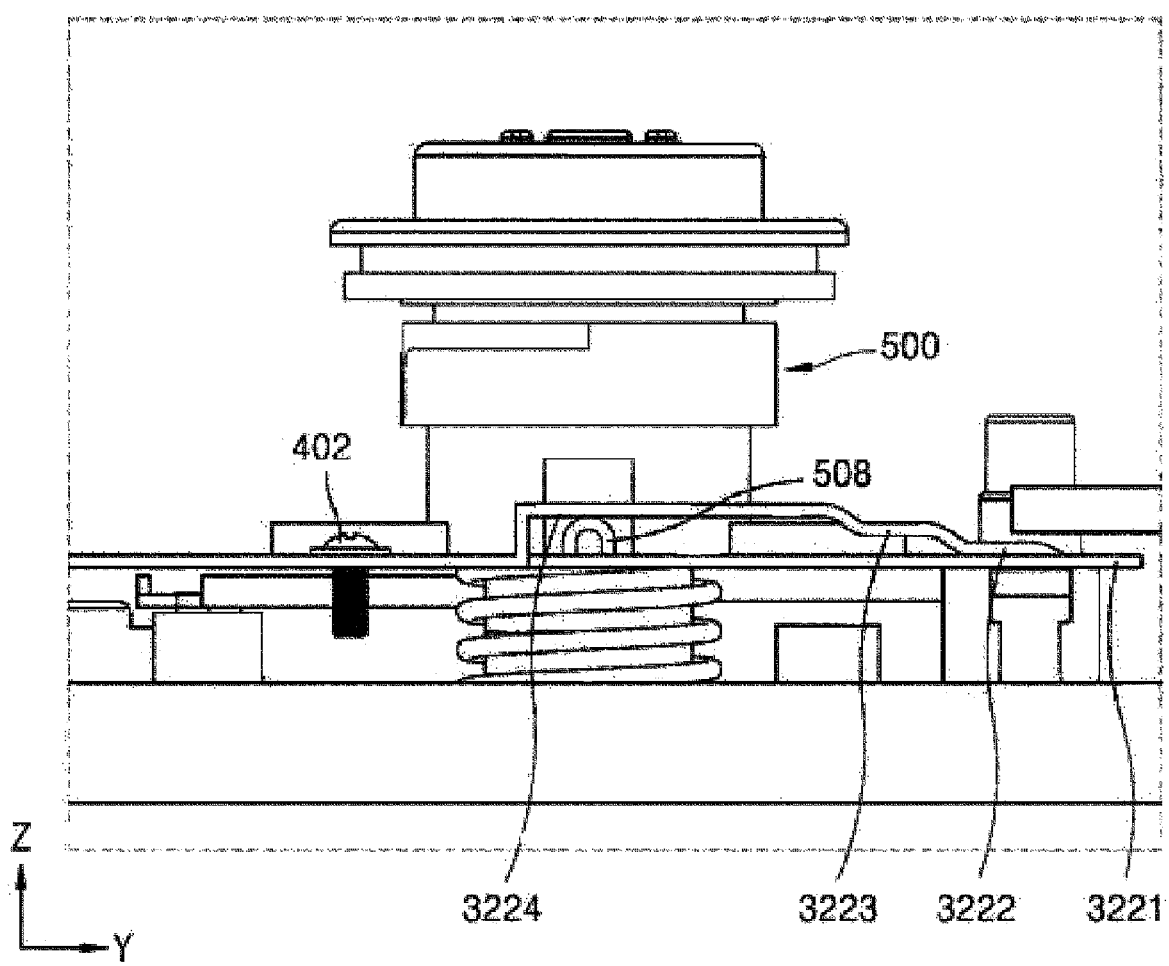

FIG. 9D may be a view illustrating that the pressure adjusting protrusion 508 is positioned under the fourth step portion 3224 when the second fastening member 402 of FIG. 4 is positioned to the fourth and fifth guide positions G4 and G5. As the height of the upper cylinder 502 increases, the pressure inside the inner pot 210 may decrease. Therefore, when the pressure adjusting protrusion 508 makes contact with a lower surface of the fourth step portion 3224, the pressure inside the inner pot 210 can be maintained at a fourth pressure, and the fourth pressure may be lower than the third pressure.

The technical idea of the present disclosure described heretofore is not limited to the above-described embodiments and accompanying drawings. Further, it will be obvious to one of ordinary skill in the technical field to which the present disclosure pertains that various substitutions, modifications, and alterations may be made without departing from the technical idea of the present disclosure.

What is claimed is:

1. A cooking device comprising:
    a main body in which an inner pot is accommodated;
    a top plate provided in a lid cover coupled to the main body;
    a locking slide coupled on the top plate so as to be linearly movable in a first direction;
    a locking structure including an engagement protrusion which is configured to be engaged with a flange portion of the inner pot;
    an inner flow path communicating with an accommodation space of the inner pot;
    a pressure adjusting rod adjusting a pressure of the inner pot by blocking the inner flow path; and
    a pressure controller configured to adjust the pressure of the inner pot by changing a degree to which the pressure adjusting rod blocks the inner flow path depending on a height of a pressure adjusting protrusion protruding outward,
    wherein the locking structure is configured to be linearly moved, depending on a position of the locking slide performing a linear movement in the first direction, between a locking position where the engagement protrusion is positioned so as to overlap with the flange portion of the inner pot in a vertical direction and an unlocking position spaced apart from the locking position toward an outside of the top plate,
    wherein the locking slide includes a multi-step structure having a plurality of step portions having different heights, and
    wherein, as the locking slide is linearly moved in the first direction, the pressure adjusting protrusion is positioned at different heights by the plurality of step portions of the multi-step structure.

2. The cooking device of claim 1, wherein the locking slide includes a guide groove which includes a first region formed in parallel with the first direction and a second region formed in a direction crossing the first direction, and
    wherein the locking structure is connected to a fastening member which is accommodated in the guide groove and is positioned to one of the first region and the second region as the locking slide is moved in the first direction.

3. The cooking device of claim 2, wherein the second region is formed in a direction away from an inside of the locking slide, and
    wherein, when the fastening member is positioned to the first region, the locking structure is positioned to the locking position, and when the fastening member is positioned to the second region, the locking structure is positioned to the unlocking position.

4. The cooking device of claim 1, wherein the locking slide includes a guide groove which includes a first region formed in parallel with the first direction and a second region formed in a direction crossing the first direction,
    wherein the locking structure is connected to a fastening member which is accommodated in the guide groove and is positioned to one of the first region and the second region as the locking slide is moved in the first direction, wherein the pressure controller adjusts a pressure of the inner pot to a first pressure when the fastening member is positioned to the first region, and adjusts the pressure of the inner pot to a second pressure when the fastening member is positioned to the second region, and wherein the first pressure is higher than the second pressure.

5. A cooking device comprising:

a main body in which an inner pot is accommodated;

a top plate provided in a lid cover coupled to the main body;

a locking slide coupled on the top plate so as to be linearly movable in a first direction;

a locking structure including an engagement protrusion which is configured to be engaged with a flange portion of the inner pot; and a safety structure which is disposed on an upper surface of the top plate and includes a safety protrusion receiving an elastic force in a vertical direction by an elastic member, wherein the locking structure is configured to be linearly moved, depending on a position of the locking slide performing a linear movement in the first direction, between a locking position where the engagement protrusion is positioned so as to overlap with the flange portion of the inner pot in a vertical direction and an unlocking position spaced apart from the locking position toward an outside of the top plate, and wherein the locking slide includes a plurality of safety grooves into which the safety protrusion is fittable depending on the position of the locking slide.

* * * * *